(12) United States Patent
Abotabl et al.

(10) Patent No.: US 12,744,572 B2
(45) Date of Patent: Sep. 22, 2026

(54) TECHNIQUES FOR REPORTING CHANNEL STATE INFORMATION BASED ON A REPORT SIZE

(71) Applicant: QUALCOMM Incorporated, San Diego, CA (US)

(72) Inventors: Ahmed Attia Abotabl, San Diego, CA (US); Yu Zhang, San Diego, CA (US); Hung Dinh Ly, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 562 days.

(21) Appl. No.: 17/807,110

(22) Filed: Jun. 15, 2022

(65) Prior Publication Data

US 2023/0412223 A1 Dec. 21, 2023

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0632* (2013.01); *H04B 7/0639* (2013.01)

(58) Field of Classification Search
CPC .. H04B 7/0626; H04B 7/0456; H04B 7/0632; H04B 7/0639
See application file for complete search history.

(56) References Cited

U.S. PATENT DOCUMENTS

2013/0336214 A1* 12/2013 Sayana ................. H04L 5/0048 370/328
2014/0010126 A1* 1/2014 Sayana ................. H04J 3/1694 370/336
2014/0162670 A1* 6/2014 Choi .................... H04B 7/0639 375/267
2019/0109626 A1* 4/2019 Park ..................... H04B 7/0658
2019/0253181 A1* 8/2019 Rahman ............... H04B 7/0626
2019/0372704 A1* 12/2019 Wang .................. H04B 7/0632
2020/0127721 A1* 4/2020 Li ........................ H04B 7/0626
2020/0389218 A1* 12/2020 Faxér .................... H04L 5/0053
2022/0029683 A1* 1/2022 Li ........................ H04B 17/318
2022/0039099 A1* 2/2022 Faxer et al. ...... H04L 27/26025
2022/0052734 A1* 2/2022 Faxer .................. H04B 7/0645
2024/0064529 A1* 2/2024 Muruganathan ....... H04B 7/024
2024/0088968 A1* 3/2024 Lo ........................ H04B 7/0626
2024/0187128 A1* 6/2024 Froberg Olsson et al. ................. H04B 7/0626

* cited by examiner

*Primary Examiner* — Luat Phung
(74) *Attorney, Agent, or Firm* — ArentFox Schiff, LLP

(57) ABSTRACT

Aspects described herein relate to receiving a channel state information (CSI) report configuration indicating a plurality of codebooks and a plurality of sub-bands associated with the plurality of codebooks, the CSI report configuration associated with a CSI report size limit, and transmit, based on the CSI report configuration, a CSI report within the CSI report size limit, the CSI report including CSI for at least a portion of the plurality of sub-bands associated with the plurality of codebooks. Other aspects relate to transmitting the CSI report configuration and receiving the CSI report.

28 Claims, 9 Drawing Sheets

500

TECHNIQUES FOR REPORTING CHANNEL STATE INFORMATION BASED ON A REPORT SIZE

FIELD OF THE DISCLOSURE

Aspects of the present disclosure relate generally to wireless communication systems, and more particularly, to techniques for reporting channel state information.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive a channel state information (CSI) report configuration indicating a plurality of codebooks and a plurality of sub-bands associated with the plurality of codebooks, the CSI report configuration associated with a CSI report size limit, and transmit, based on the CSI report configuration, a CSI report within the CSI report size limit, the CSI report including CSI for at least a portion of the plurality of sub-bands associated with the plurality of codebooks.

In another aspect, an apparatus for wireless communication is provided that includes a processor, memory coupled with the processor, and instructions stored in the memory. The instructions are operable, when executed by the processor, to cause the apparatus to transmit a CSI report configuration indicating a plurality of codebooks and a plurality of sub-bands associated with the plurality of codebooks, the CSI report configuration associated with a CSI report size limit, and receive, based on the CSI report configuration, a CSI report within the CSI report size limit, the CSI report including CSI for at least a portion of the plurality of sub-bands associated with the plurality of codebooks.

In another aspect, a method of wireless communication at a user equipment (UE) is provided that includes receiving a CSI report configuration indicating a plurality of codebooks and a plurality of sub-bands associated with the codebooks, the CSI report configuration further indicating a CSI report size limit, and transmitting, based on the CSI report configuration, a CSI report within the CSI report size limit, the CSI report including CSI for the sub-bands associated with the codebooks.

In another aspect, a method of wireless communication at a network node is provided that includes transmitting a CSI report configuration indicating a plurality of codebooks and a plurality of sub-bands associated with the codebooks, the CSI report configuration further indicating a CSI report size limit, and receiving, based on the CSI report configuration, a CSI report within the CSI report size limit, the CSI report including CSI for the sub-bands associated with the plurality of codebooks.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
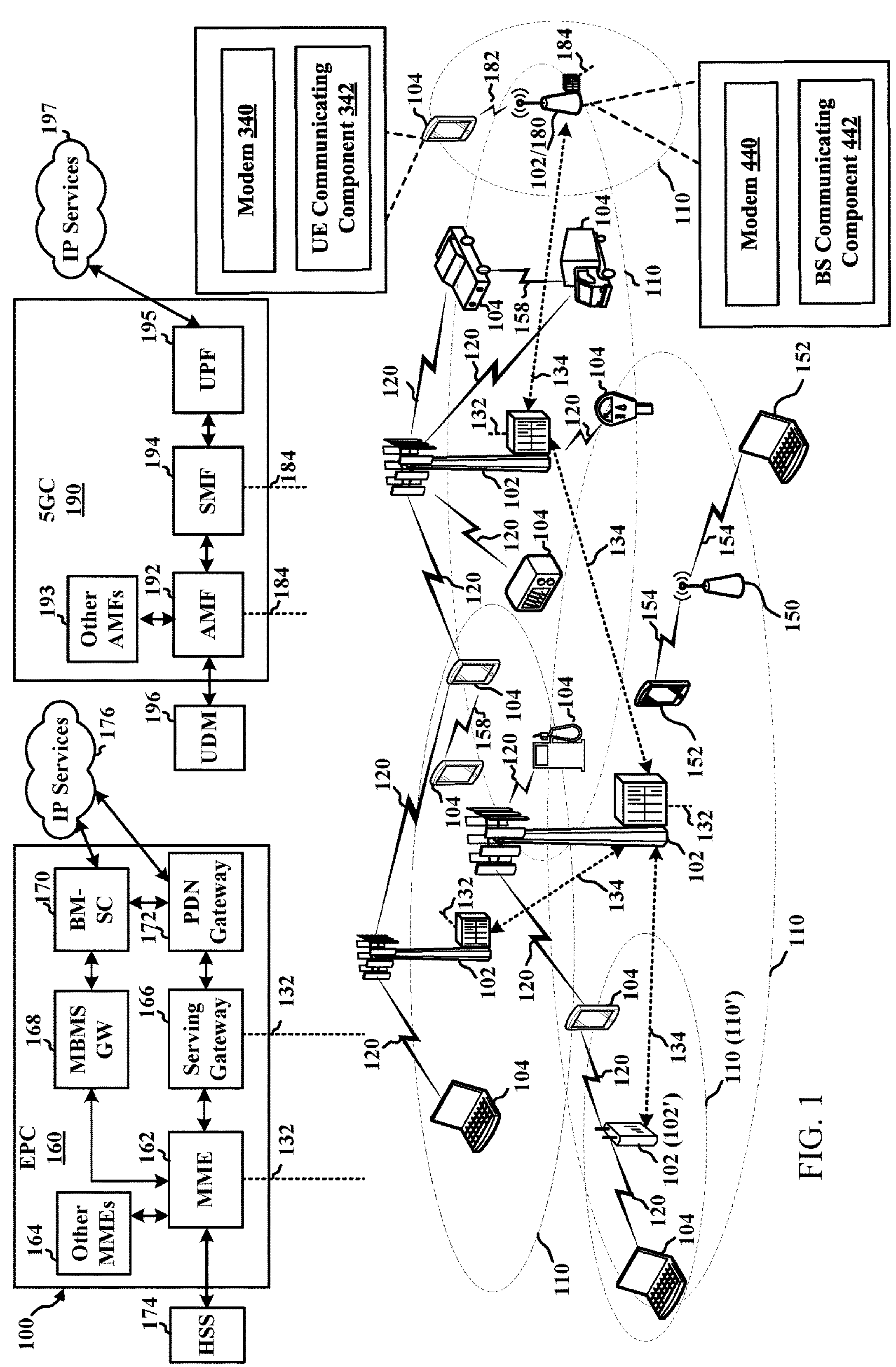
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting channel state information (CSI) in wireless communications. In some wireless communication technologies, such as fifth generation (5G) new radio (NR) or other third generation partnership project (3GPP) technologies, devices (e.g., user equipment (UEs)) can report CSI to network nodes based on measuring received reference signals (RS), such as CSI-RS. A network node can configure a UE to report CSI for wideband and/or one or more sub-band frequency allocations. In an example, recent developments in massive multiple-input multiple-output (MIMO) can use multiple co-located antenna panels at a base station each including multiple antenna ports. Each panel can be equipped with a large number of power amplifiers (PAs) and antenna subsystem that can consume a large amount of power. In some examples, the network node can dynamically power off some antenna panels or sub-panels or some antenna ports for energy efficiency when the cell load is low (e.g., less than a threshold). Accordingly, for example, the network node can benefit from CSI for different configurations of the antenna panels or ports. As such, the network node can configure the UE to report CSI for the different configurations of the antenna panels or ports.

For example, the CSI report configuration can be radio resource control (RRC) configured per bandwidth part (BWP), and may include a configuration of non-zero power (NZP) CSI-RS resources configured for channel measurement, a configuration of CSI-RS resources configured for interference measurement, and/or a configuration of NZP CSI-RS resources configured for interference measurement. The resource sets may include Ks resources with the same number of CSI-RS ports (e.g., Ks=1 such that each resource can include at most 32 CSI-RS ports, Ks=2 such that each resource can include at most 16 CSI-RS ports, 2<Ks<=8 such that each resource can include at most 8 CSI-RS ports, etc.). The CSI report configuration may also include a report configuration type (e.g., periodic, semi-persistent, aperiodic, etc.).

In addition, the CSI report configuration can include a codebook configuration that can indicate one or more codebook types that may each have associated antenna configurations. For example, the one or more codebook types, which may be specified for precoding matrix indicator (PMI) codebook, can include Type I Single-panel, Type I multiple panels, Type II Single-panel, Type II port selection, or Type II enhanced port selection. In addition, specific configuration of the antenna elements can be supported, such as the antenna element configuration (e.g., number of antenna rows and columns—N1, N2), and number of panels (Ng) for each codebook type and corresponding number of CSI-RS antenna ports (per resource)=2NgN1N2.

In an example, for Type 1, a single slot reporting can include a CSI report of up to 2 parts. Part 1 can include a rank indicator/CSI-RS resource indicator (CRI), channel quality indicator (CQI) for the first codeword (CW). Part 2 can include PMI, CQI for the second codeword (e.g., when RI>4). Type I can be supported for periodic, semi-persistent, and aperiodic CSI and can be carried on short or long physical uplink control channel (PUCCH) and physical uplink shared channel (PUSCH) (and/or Type I sub-band CSI can be carried on PUSCH and long PUCCH). For Type II, a CSI report can include up to two parts. Part 1 can include RI, CQI, and indication of a number of non-zero wideband amplitude coefficients per layer (which can be a fixed payload size where each field can be separately encoded and used to identify a number of information bits of the Part 2). Part 2 can include PMI corresponding to indicated non-zero wideband amplitude coefficients per layer in Part 1. Type II can be supported for semi-persistent and aperiodic CSI and can be carried on long PUCCH (for Part 1) and PUSCH (Part 1 and/or Part 2). For Type II, CSI parameters of a report may or may not be multiplexed across PUCCH or PUSCH transmissions, and CSI reports on long PUCCH and on PUSCH can be independently calculated. Whether a UE can be configured with Type II CSI reports on both long PUCCH and PUSCH can be indicated by a UE capability. In addition, in an example, layer 1 (L1)-reference signal received power (RSRP) and resource indicators for beam management can be mapped to Part 1 when reported on long PUCCH or PUSCH.

As described, for example, a UE may be configured with multiple codebooks in a CSI report configuration where each codebook can be associated with an antenna port configuration (e.g., (N1, N2)), beam restriction and RI restriction. The resource for CSI measurement can be shared among configured codebooks. The UE can send CSI report to the base station including CSIs associated with a subset of codebooks. In an example, the UE can compute CSI for each codebook and can sort CSIs (e.g., according to spectral efficiency). The UE can then report one or a subset of best CSIs in the same CSI report. As the CSI report configuration may include multiple antenna configurations, codebooks, etc. to report, CSI-RS reporting by the UE can become voluminous. This can be further increased where multiple codebooks have configured wideband and sub-band reporting. Reporting all of the CSI may cause delay in reporting and large energy consumption by the UE. Accordingly, aspects described herein relate to limiting the amount of information in, or bits consumed by, reporting CSI.

In one example, the CSI report configuration can indicate a maximum report size such that if the report size generated by the UE exceeds (or is computed to exceed) the maximum report size, the UE can perform an adaptive report generation so the CSI report can fit within the maximum report size. In one example, the UE can apply a sub-band size adaptation depending on codebook size to reduce the number of sub-bands (or increase the sub-band size) for which CSI is reported. The UE, for example, may apply the subband size adaptation for all codebooks or for certain ones of the codebooks (e.g., based on a codebook priority, based on adapting one sub-band per codebook at a time until the report size within the maximum report size, etc.). In another example, the UE can be configured (e.g., via the CSI report configuration or otherwise) with a timeline for preparing the CSI report, and the UE can prepare the report based on the timeline, which may include dropping some sub-band size measurements in a same configured reporting order, an opposite configured order, etc. In any case, the amount of CSI feedback reported by the UE can be decreased.

In an example, decreasing the amount of CSI to report, the size or number of bits of the report, etc., can conserve radio frequency (RF) resources used to transmit the report from the UE to the network node, can conserve processing resources at the UE used in performing CSI measurements, etc. This can improve power consumption by the device when operating using a battery, conserve the RF resources for other communications, and/or the like, which can improve user experience when using the UE or other device.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for generating and/or transmitting a CSI report based on a CSI report configuration associated with a CSI report size limit, in accordance with aspects described herein. In addition, some nodes may have a modem 440 and BS communicating component 442 for configuring a UE for generating and/or transmitting a CSI report based on a CSI report configuration associated with a CSI report size limit, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB 1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can generate and/or transmit a CSI report based on a CSI report configuration. In accordance with aspects described herein, UE communicating component 342 can adapt the CSI report based on a CSI report size limit. For example, UE communicating component 342 can adapt sub-band sizes of one or more sub-bands for which the UE is configured to report CSI in order to reduce a size of the CSI report. Various strategies are described for determining for which sub-bands to adapt the sub-band size, and can include adapting sub-bands based on an associated codebook, according to a configured ordering, based on determining how many measurements can be performed and/or corresponding CSI generated within a certain time duration, and/or the like. BS communicating component 442 can configure the UE with the CSI report configuration and/or can configure the UE to accordingly adapt the CSI report. In one example, the CSI report configuration can include one or more parameters related to adapting the CSI report to be within the CSI report size limit.

Figure 2:
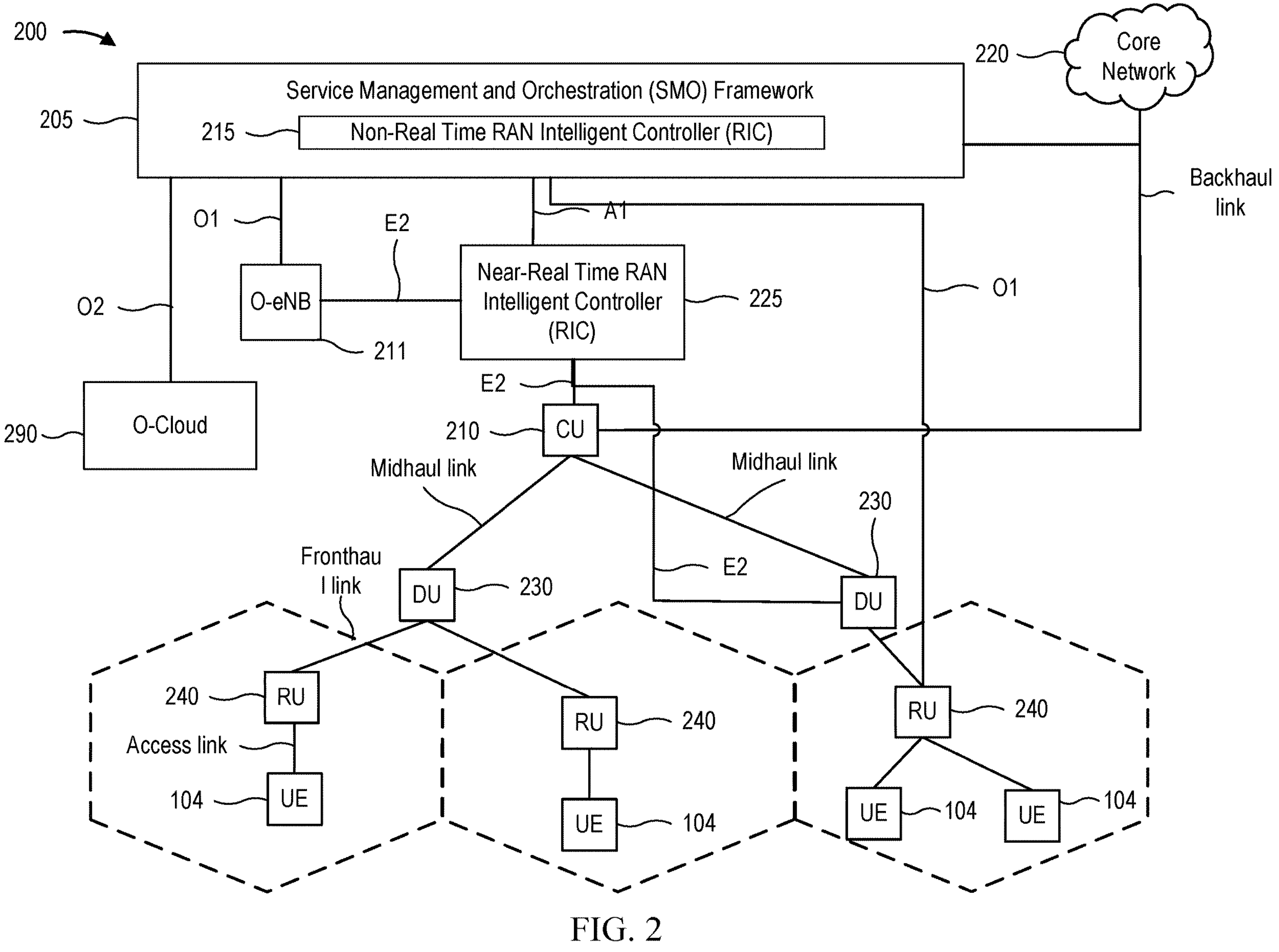
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can transmit the one or more alignment parameters to one or more DUs 230. In this example, the one or more DUs 230 can configure the UE 104 with the alignment parameters for receiving the transmission burst in CDRX mode. In another example, BS communicating component 442, as described herein, can be at least partially implemented within a DU 230, and can transmit the one or more alignment parameters to one or more RUs 240. In this example, the one or more RUs 240 can configure the UE 104 with the alignment parameters for receiving the transmission burst in CDRX mode.

Figure 3:
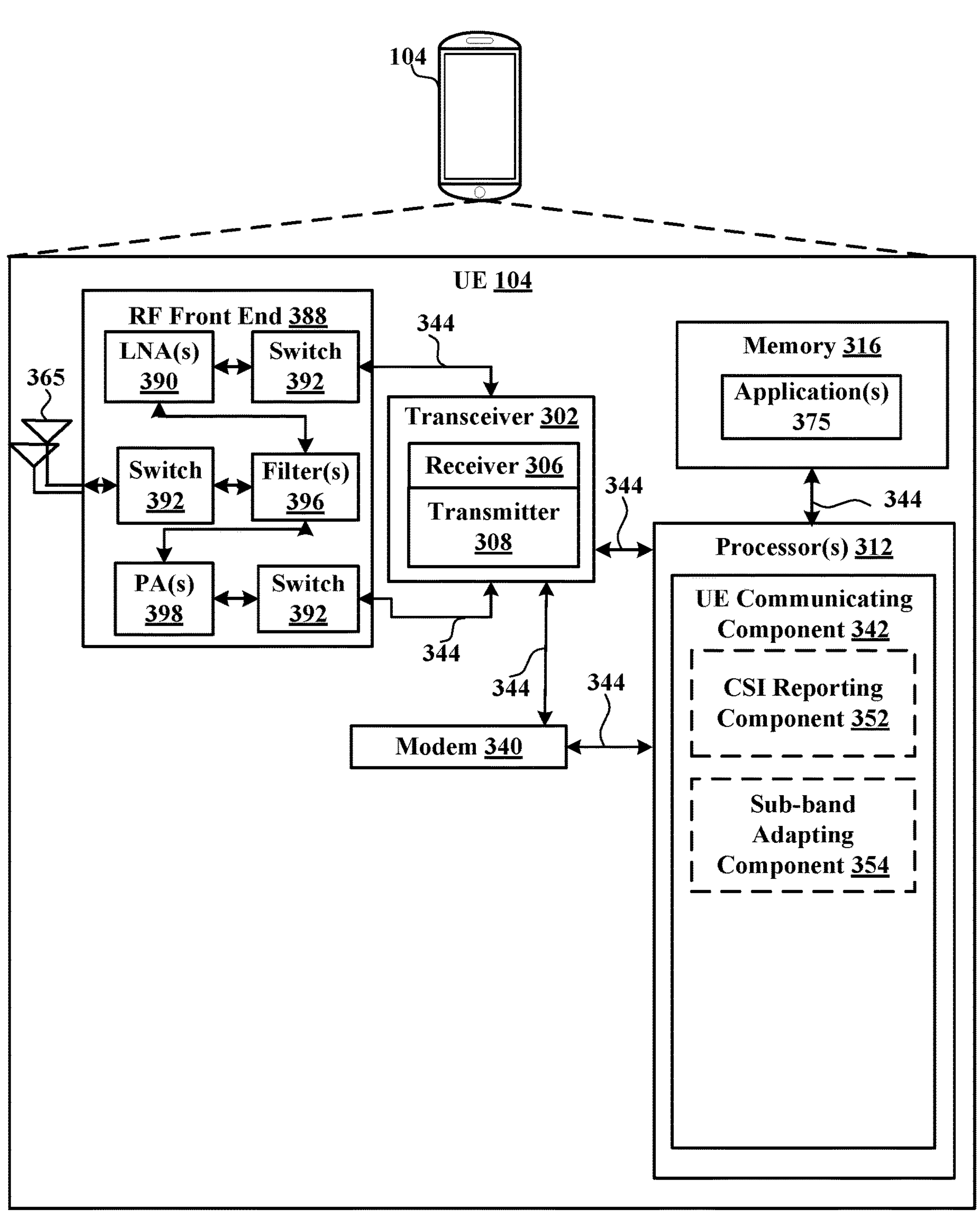
FIG. 3 is a block diagram illustrating an example of a user equipment (UE), in accordance with various aspects of the present disclosure.
Figure 4:
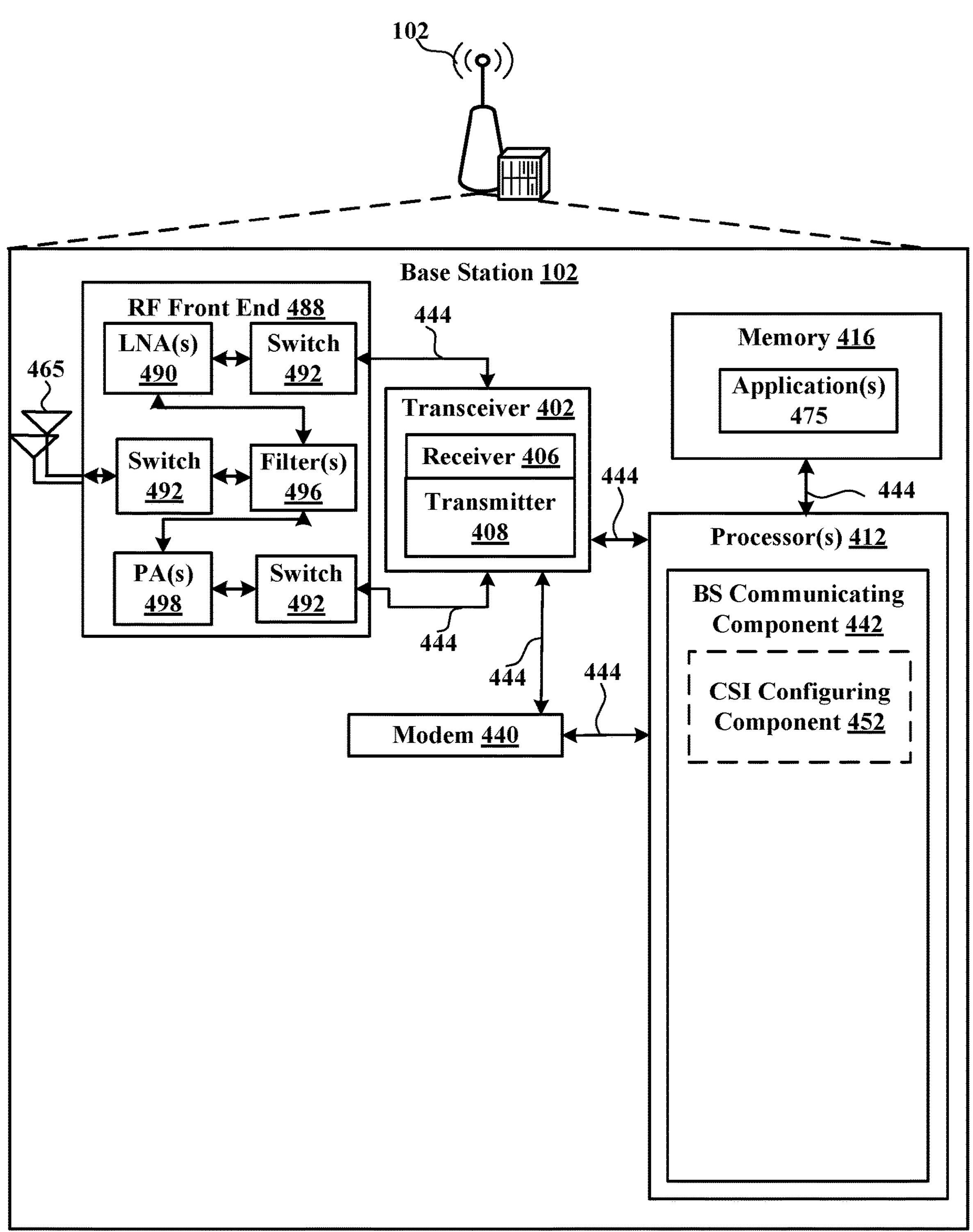
FIG. 4 is a block diagram illustrating an example of a base station, in accordance with various aspects of the present disclosure.
Figure 5:
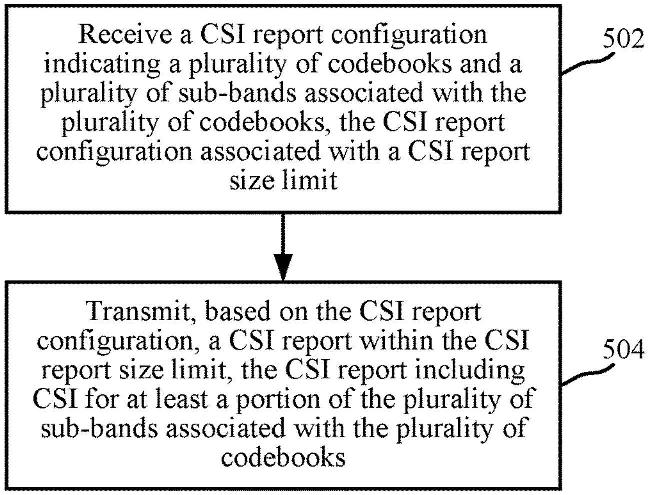
FIG. 5 is a flow chart illustrating an example of a method for transmitting a channel state information (CSI) report, in accordance with aspects described herein.
Figure 6:
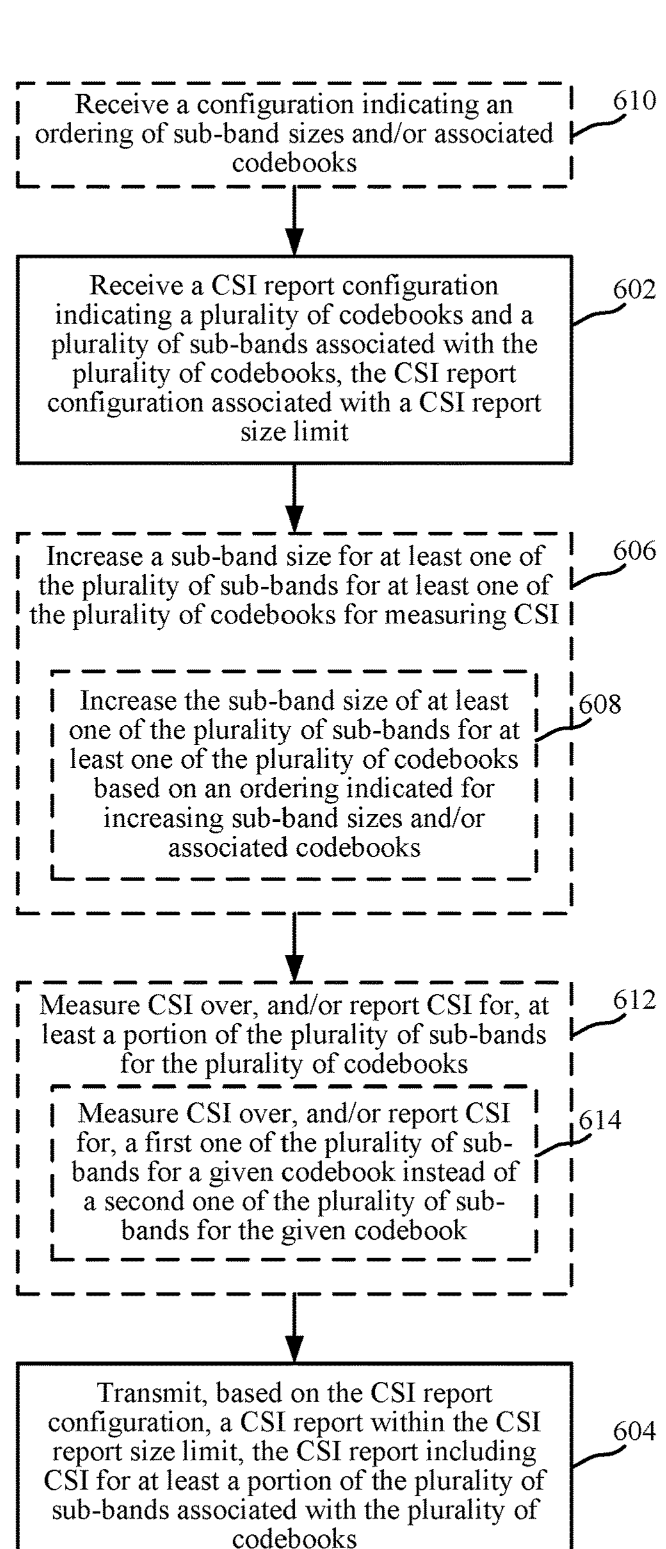
FIG. 6 is a flow chart illustrating an example of a method for adapting a CSI report for transmission, in accordance with aspects described herein.
Figure 7:
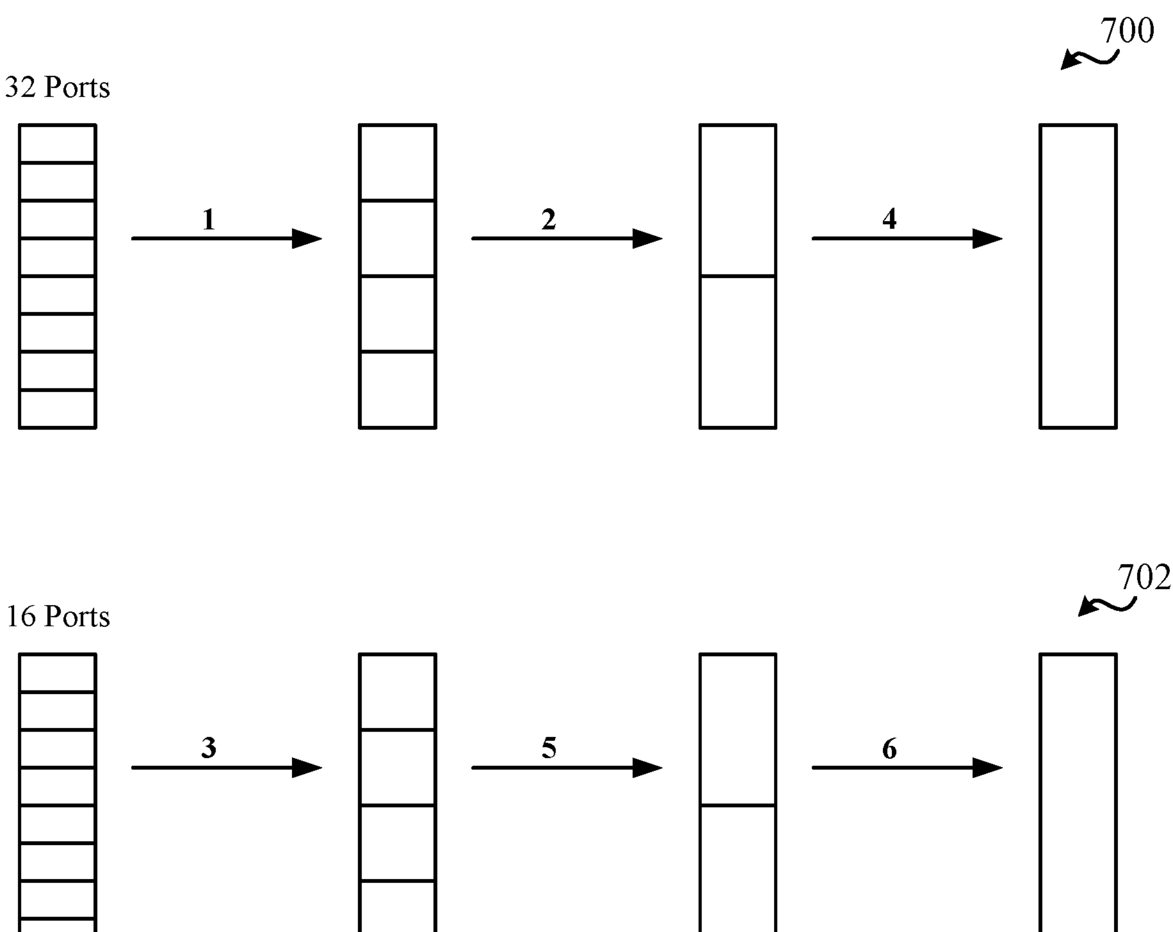
FIG. 7 illustrates an example of sub-bands configured for multiple antenna port configuration codebooks, in accordance with aspects described herein.
Figure 8:
FIG. 8 is a flow chart illustrating an example of a method for configuring a device for adapting a CSI report for transmission, in accordance with aspects described herein.
Figure 8:
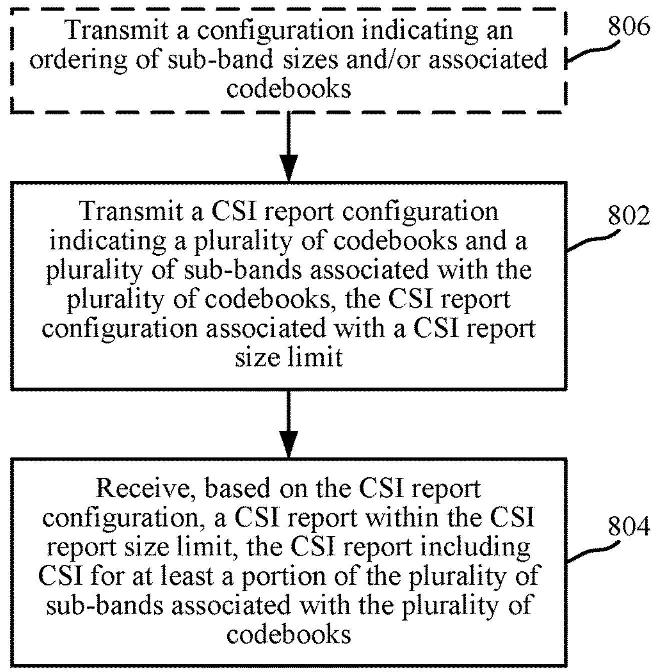

Turning now to FIGS. 3-9, aspects are depicted with reference to one or more components and one or more methods that may perform the actions or operations described herein, where aspects in dashed line may be optional. Although the operations described below in FIGS. 5, 6, and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for generating and/or transmitting a CSI report based on a CSI report configuration associated with a CSI report size limit, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a CSI reporting component 352 for generating a CSI report (e.g., based on a CSI report configuration) for transmitting to a network node (e.g., a base station 102), and/or a sub-band adapting component 354 for adapting one or more sub-bands over which to measure and report CSI, which may be based on a CSI report size limit, in accordance with aspects described herein.

In an aspect, the processor(s) 312 may correspond to one or more of the processors described in connection with the UE in FIG. 9. Similarly, the memory 316 may correspond to the memory described in connection with the UE in FIG. 9.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for configuring a UE for generating and/or transmitting a CSI report based on a CSI report configuration associated with a CSI report size limit, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a CSI configuring component 452 for configuring a UE to report CSI including a plurality of sub-bands associated with a plurality of codebooks, in accordance with aspects described herein.

In an aspect, the processor(s) 412 may correspond to one or more of the processors described in connection with the base station in FIG. 9. Similarly, the memory 416 may correspond to the memory described in connection with the base station in FIG. 9.

FIG. 5 illustrates a flow chart of an example of a method 500 for transmitting a CSI report, in accordance with aspects described herein. In an example, a UE 104 can perform the functions described in method 500 using one or more of the components described in FIGS. 1 and 3.

In method 500, at Block 502, a CSI report configuration indicating a plurality of codebooks and a plurality of sub-bands associated with the plurality of codebooks can be received, where the CSI report configuration can be associated with a CSI report size limit. In an aspect, CSI reporting component 352, e.g., in conjunction with processor(s) 312, memory 316, transceiver 302, UE communicating component 342, etc., can receive the CSI report configuration indicating the plurality of codebooks and the plurality of sub-bands associated with the plurality of codebooks, where the CSI report configuration can be associated with a CSI report size limit. For example, the CSI report configuration can indicate the plurality of codebooks, where each codebook can indicate or otherwise relate to an antenna panel configuration including a number of active antenna panels (Ng) or antenna elements in each panel (N1,N2), etc., as described. The CSI report configuration can also indicate, for each codebook or for all codebooks, a plurality of sub-bands in frequency for which to report CSI based on a given codebook, where the sub-bands may include a wideband and one or more sub-bands of the wideband. The sub-bands can be of various sizes, which may be indicated in number of resource blocks (RBs) or another measurement. For example, the CSI report configuration can specify, for a given codebook or all codebooks, to report CSI for 32 RBs, 16 RBs, 8 RBs, and/or 4 RBs, etc.

A network node can include multiple antenna configuration codebooks in the CSI report configuration, and reporting of the CSI for each antenna configuration can enable adaptation of the antenna configuration at the network node. For example, the network node can dynamically use a certain number of antenna ports or configuration thereof based on the CSI reporting. For example, the network node can decrease the number of antenna ports or elements used when network load is low or can increase as network load increases. The network node can accordingly adapt communications with the UEs 104 when changing the antenna configuration based on the CSI reported for the selected antenna configuration.

Adapting the number of antenna ports used can support network energy savings at the network node, but configuring a CSI report to include CSI for various codebooks and various sub-band sizes within for each codebook can become voluminous, and the UE 104 may accordingly be delayed in generating the CSI report or can have high energy consumption or use a high number of resources to transmit the CSI report. As such, for example, the UE 104 can adaptively reduce the CSI report size to be within the CSI report size limit, as described herein. In one example, the UE 104 can adapt a sub-band size for at least one of the plurality of sub-bands and/or for at least one codebook (e.g., to refrain from reporting CSI for certain sub-bands) to limit the size of the CSI report. In one example, sub-band adapting component 354 can adapt the sub-bands for which CSI is reported to reduce the CSI report to be within the CSI report size limit. The CSI report size limit can be configured for the UE 104, which may include an indication the CSI report configuration or other configuration indicated to the UE 104 by the network node, store by the UE 104 in memory 316, etc. In one example, the CSI report size limit can be specified as a number of bits (e.g., a maximum quantity of bits) configured for the CSI report or for a portion of the CSI report. For example, the CSI report can include at least one of a RI, CQI, or PMI, and the CSI report size limit may be indicated as a maximum quantity of bits for the entire CSI report or for certain portions, such as the RI, CQI, and/or PMI.

Moreover, in one example, the CSI report size limit can relate to the uplink resources allocated for transmitting the CSI report. For example, UE communicating component 342 can receive, from the network node, a resource allocation of uplink resources (e.g., PUCCH resources, PUSCH resources, etc.) over which the UE 104 can transmit the CSI report. The CSI report size limit can be determined as a function of a size of the resource allocation (or a number of resources or RBs, number of symbols, etc. indicated in the resource allocation). In one example, CSI reporting component 352 can compute a number of bits that can be transmitted over the resource allocation for determining a CSI report size limit. For example, the resource allocation may be dynamically scheduled, semi-persistently scheduled, etc.). In an example, sub-band adapting component 354 can adapt the sub-bands so the CSI report can fit within the uplink resources allocated for transmitting the CSI report (e.g., over PUCCH, PUSCH, etc.), as described above and further herein.

In addition, in some examples, CSI reporting component 352 can use a differential value (e.g. instead of an absolute value) to report CSI to reduce the CSI report size, where the differential value can use a smaller number of bits than actual CSI value. For example, this can be used for CQI values, where the differential CQI value can be an offset to a reference CQI value (e.g., sub-band CQI values can be an offset from a wideband CQI value for the codebook).

In method 500, at Block 504, a CSI report that is within the CSI report size limit can be transmitted, where the CSI report includes CSI for at least a portion of the plurality of sub-bands associated with the plurality of codebooks. In an aspect, CSI reporting component 352, e.g., in conjunction with processor(s) 312, memory 316, transceiver 302, UE communicating component 342, etc., can transmit, based on the CSI report configuration, the CSI report within the CSI report size limit, where the CSI report can include CSI for at least the portion of the plurality of sub-bands associated with the plurality of codebooks. For example, as described sub-band adapting component 354 may adapt the sub-band size or otherwise adapt the sub-bands for which CSI is reported so the size of the CSI report is within the CSI report size limit.

FIG. 6 illustrates a flow chart of an example of a method 600 for adapting a CSI report for transmission, in accordance with aspects described herein. In an example, a UE 104 can perform the functions described in method 600 using one or more of the components described in FIGS. 1 and 3.

In method 600, at Block 602, a CSI report configuration indicating a plurality of codebooks and a plurality of sub-bands associated with the plurality of codebooks can be received, where the CSI report configuration can be associated with a CSI report size limit, as described above in Block 502 of method 500 in FIG. 5. In method 600, at Block 604, a CSI report that is within the CSI report size limit can be transmitted, where the CSI report includes CSI for at least a portion of the plurality of sub-bands associated with the plurality of codebooks, as described above in Block 504 of method 500 in FIG. 5.

In method 600, optionally at Block 606, a sub-band size for at least one of the plurality of sub-bands for at least one of the plurality of codebooks can be increased for measuring CSI. In an aspect, sub-band adapting component 354, e.g., in conjunction with processor(s) 312, memory 316, transceiver 302, UE communicating component 342, etc., can increase the sub-band size for at least one of the plurality of sub-bands for at least one of the plurality of codebooks for measuring CSI. For example, increasing the sub-band size can reduce the number of sub-bands for which the CSI is measured and reported. For example, where a certain sub-band is indicated as 4 RBs, there can be more 4 RB sub-bands in the frequency band than 8 RB sub-bands. Thus, increasing the sub-band size from 4 RB to 8 RB can reduce the CSI reporting (e.g., by half) for the given sub-band.

In an example, sub-band adapting component 354 can perform this adaptation for a selected sub-band of a selected codebook, where the selection can be based on various criteria. For example, if the UE 104 does not have enough uplink resources to transmit the CSI report for the different codebooks, wideband, and sub-bands, or if the CSI report size otherwise exceeds a limit, sub-band adapting component 354 can apply a sub-band size adaptation depending on the codebook size. As the CSI report can include multiple codebooks with potentially different priorities, sub-band adapting component 354 may not apply the sub-band adaptation for one codebook configuration but it might have a specific ordering depending on the sub-band size. In one example, the CSI report configuration or another configuration received by the UE 104 can indicate the priority of the codebook (e.g., as a priority bit or other value, which may indicate high priority or low priority, etc.).

For example, sub-band adapting component 354 can increase a sub-band size of one or more sub-bands configured for a codebook having a larger codebook size (e.g., a larger or largest number of antenna ports of the configured codebooks), which may also include the sub-band adapting component 354 not adapting sub-band sizes for other codebooks. In another example, sub-band adapting component 354 can increase a sub-band size of one or more sub-bands configured for a codebook having a lower priority (e.g., a lower or lowest priority among the configured codebooks, or an indicated secondary codebook), which may also include the sub-band adapting component 354 not adapting sub-band sizes for other codebooks (e.g., higher priority codebooks, or an indicating primary or default codebook). For example, increasing sub-band size may negatively impact CSI reporting as a highest resolution/granularity or smallest sub-band size may be desired for more narrow CQIs. Thus, in this example, sub-band adapting component 354 can limit adaptation to the lower priority codebook(s). Alternatively, for the higher priority codebook, sub-band adapting component 354 may increase the sub-band size for according to a configured order, as described herein (e.g., increase one sub-band size for the secondary codebook, then one sub-band size for main codebook, then sub-band size for secondary codebook, etc.).

In one example, in increasing the sub-band size at Block 606, optionally at Block 608, the sub-band size of at least one of the plurality of sub-bands for at least one of the plurality of codebooks can be increased based on an ordering indicated for increasing sub-band sizes and/or associated codebooks. In an aspect, sub-band adapting component 354, e.g., in conjunction with processor(s) 312, memory 316, transceiver 302, UE communicating component 342, etc., can increase the sub-band size of at least one of the plurality of sub-bands for at least one of the plurality of codebooks based on the ordering indicated for increasing sub-band sizes and/or associated codebooks. For example, the ordering can be configured by the network node or otherwise known or stored in instructions in the UE 104 (e.g., in memory 316). In one example, optionally at Block 610, a configuration indicating an ordering of sub-band sizes and/or associated codebooks can be received. In an aspect, sub-band adapting component 354, e.g., in conjunction with processor(s) 312, memory 316, transceiver 302, UE communicating component 342, etc., can receive the configuration indicating the ordering of sub-band sizes and/or associated codebooks. For example, sub-band adapting component 354 can receive the configuration in RRC or other signaling from the network node (e.g., as part of the CSI report configuration or a separate configuration) or can receive the configuration from memory 316, etc.

In an example, the configuration may specify an ordering of sub-bands (e.g., specific sub-band frequencies) or sub-band sizes for increasing in generating a CSI report that complies with the CSI report size limit or otherwise fits in the uplink resources allocated for transmitting the CSI. In an example, the ordering of sub-band or sub-band sizes may be specific to codebooks or generic for all codebooks. For example, the configuration may indicate to increase any 4

RB sub-bands to 8 RB sub-bands (or 16 RB sub-bands or higher, etc.) first before increasing any 8 RB sub-bands for the purpose of measuring and reporting CSI. In another example, the configuration may indicate to increase sub-band sizes of a certain codebook (or a largest codebook or lowest priority codebook, etc.) first before increasing sub-band sizes of other codebooks. For example, sub-band adapting component 354 can adapt the sub-band sizes according to the ordering until the CSI report complies with the CSI report size limit and/or can fit within the uplink resources allocated for transmitting the CSI report.

In method 600, optionally at Block 612, CSI can be measured over, and/or reported for, at least a portion of the plurality of sub-bands for the plurality of codebooks. In an aspect, CSI reporting component 352, e.g., in conjunction with processor(s) 312, memory 316, transceiver 302, UE communicating component 342, etc., can measure the CSI over, and/or report the CSI for, at least the portion of the plurality of sub-bands (e.g., at least one or more of which may have been adapted) for the plurality of codebooks. CSI reporting component 352 can include these measurements in the CSI report transmitted at Block 604 such that the CSI report can comply with the CSI report size limit and/or the uplink resources allocated for transmitting the CSI report. As described in examples further herein, CSI reporting component 352 can either use the functions described herein in determining the sub-bands over which to measure CSI, or the CSI reporting component 352 can measure CSI over all of the sub-bands for all of the codebooks as configured and can use the functions described herein in determining the sub-bands for which to report the measured CSI. In addition, in one example, CSI reporting component 352 can separately measure CQI and PMI as the CSI, and in some examples can measure selected sub-bands for each. In one specific example, CSI reporting component 352 can select, for one or more codebooks, sub-bands over which to measure CQI and can separately select, for one or more codebooks, sub-bands over which to measure PMI, in accordance with aspects described herein.

In one specific example, the CSI report configuration can configure each codebook with multiple sub-bands of different sub-band sizes, e.g., if the UE 104 is to apply sub-band adaptation, and the sub-band adapting component 354 may select, for each codebook or at least one codebook, a subset of the multiple sub-bands (e.g., not all of the configured multiple sub-bands) over which to measure, and/or for which to report, CSI so that the CSI report can be within the CSI report size limit and/or the uplink resources allocated for transmitting the CSI report. For example, in measuring the CSI at Block 612, optionally at Block 614, CSI can be measured over, and/or reported for, a first one of the plurality of sub-bands for a given codebook instead of a second one of the plurality of sub-bands for the given codebook. In an aspect, CSI reporting component 352, e.g., in conjunction with processor(s) 312, memory 316, transceiver 302, UE communicating component 342, etc., can measure CSI over, and/or report CSI for, the first one of the plurality of sub-bands for the given codebook instead of the second one of the plurality of sub-bands for the given codebook. For example, sub-band adapting component 354 can select the first one of the plurality of sub-bands over the second one of the plurality of sub-bands based on the first one of the plurality of sub-bands having an increased size over the second one of the plurality of sub-bands.

In one example, sub-band adapting component 354 can select, for each of the plurality of codebooks, the first one of the plurality of sub-bands over the second one of the plurality of sub-bands based on the increase in sub-band size. In this example, the increase in sub-band size can yield a CSI report with less CSI (as the number of sub-bands decreases based on the increase in size). For example, sub-band adapting component 354 can determine, for each codebook, to move from a small sub-band size to a larger sub-band size, where both sizes can be configured in the CSI report configuration, to measure and report CSI. In this regard, for example, CSI reporting component 352 can skip or refrain from measuring and/or reporting CSI for the small sub-band size.

In another example, sub-band adapting component 354 can select, for a subset of the plurality of codebooks, the first one of the plurality of sub-bands over the second one of the plurality of sub-bands based on the increase in sub-band size. For example, sub-band adapting component 354 can determine, for the subset of codebooks, to move from a small sub-band size to a larger sub-band size, where both sizes can be configured in the CSI report configuration, to measure and report CSI. In an example, sub-band adapting component 354 can determine the subset of codebooks as including codebooks having a lower priority or a secondary codebook indication, and excluding codebooks having a higher priority or default or main codebook indication.

In yet another example, sub-band adapting component 354 can select the sub-bands based on a configuration indicating an ordering of the sub-band sizes to increase. For example, sub-band adapting component 354 can determine, for a codebook at a time, to move from a first sub-band size to a second sub-band size based on the ordering in the configuration. In one example, sub-band adapting component 354 can determine the ordering of codebooks as well, which may be indicated in the configuration or otherwise determined, for each sub-band size, as moving the sub-band size for lower priority or secondary codebooks before the higher priority or main/default codebook. In one example, sub-band adapting component 354 can receive the RRC configuration, as described in Block 610.

In another example, sub-band adapting component 354 can select the sub-bands based on a configuration indicating an ordering of configured codebooks and sub-band sizes. An example is shown in FIG. 7. FIG. 7 illustrates an example of sub-bands 700 configured for a 32 antenna port codebook, including 4 RB (8 sub-bands), 8 RB (4 sub-bands), 16 RB (2 sub-band), 32 RB (wideband), and an example of sub-bands 702 configured for a 16 antenna port codebook including 4 RB (8 sub-bands), 8 RB (4 sub-bands), 16 RB (2 sub-band), 32 RB (wideband). In this example, the order of changes in sub-band size can be to first increase the 4 RB size to 8 RB for the 32 antenna port codebook, then to increase the 8 RB size to 16 RB for the 32 antenna port codebook, then to increase the 4 RB size to 8 RB for the 16 antenna port codebook, then to increase the 16 RB size to 32 RB for the 32 antenna port codebook, then to increase the 8 RB size to 16 RB for the 16 antenna port codebook, then to increase the 16 RB size to 32 RB for the 16 antenna port codebook, as needed to generate a CSI report that complies with the CSI report size limit or resources allocated for transmitting the CSI report. In an example, sub-band adapting component 354 can accordingly attempt to measure and/or report CSI based on this ordering of increasing sub-bands until the CSI report is within the CSI report size limit or the resource allocation for transmitting the CSI report.

In one example, this configuration can be specified in a table configured for the UE 104 (e.g., by the network node or otherwise). For example, the table may have a format similar to the following:

| Ports | Sub-band size |
|---|---|
| 32, 16 | 4 RBs, 4 RBs |
| 32, 16 | 8 RBs, 4 RBs |
| 32, 16 | 16 RBs, 4 RBs |
| 32, 16 | 16 RBs, 8 RBs |

This table can represent the first four steps described in FIG. 7 above. In this example, sub-band adapting component 354 can adapt sub-band size for both the 32 port codebook and the 16 port codebook in the above sequence based on receiving the configured table. In other examples, the table may include, and/or the sub-band adapting component 354 may adapt, sub-band sizes for additional codebooks (e.g., an 8 antenna port codebook in addition to the 32 and 16 port).

In an example, sub-band adapting component 354 can increase sub-band sizes and/or select the first one of the plurality of sub-bands for use in measuring and reporting CSI instead of the second one of the plurality of sub-bands based on other considerations as well, such as an expected processing performance or an expected time duration for measuring and/or reporting the CSI. For example, a UE 104 can have (and/or report) a capability on the number of simultaneous CSI Processing Units (CPUs) $N_{CPU}$ the UE can handle. There can be a running count, L, of occupied CPUs, representing the processing units that are in use by ongoing CSI reports. At any given time, the $N_{CPU}$–L unoccupied CPUs can be used to add more CSI reports for processing. Once there are no more unoccupied CPUs available, the UE may not process more CSI. The UE can still send CSI report even in this case, but for the CSI requests that are over the limit, the UE may be allowed to send outdated reports. When a CSI calculation starts, the count L can be incremented by $O_{CPU}$, where $O_{CPU}$ is the load designation of the new CSI process, and at any time a CSI calculation ends, the count L can be decremented by $O_{CPU}$, where $O_{CPU}$ is the load designation of the completed CSI process.

In the examples described above where the sub-band adapting component 354 is increasing sub-band sizes or otherwise selecting certain sub-band size to report over others, this may increase the processing units used to generate different reports for different number of ports. In an example, sub-band adapting component 354 can utilize some logic or regulations in selecting the sub-bands for measurement or measurement processing so the UE 104 is not overwhelmed with processing overload. For example, CSI reporting component 352 can configure a timeline or time duration to prepare the CSI measurement reports and it can be up to the CSI reporting component 352 and/or sub-band adapting component 354 how to process these measurements. For example, the CSI reporting component 352 can be configured to prepare the measurements of all the codebooks in a given time in terms of symbols/slots or absolute time unit. For example, if CSI reporting component 352 determines that it cannot finish all the measurements, or measurement preparation, in the configured timeline or time duration, sub-band adapting component 354 can drop certain sub-band size measurement preparation, as described above, so that the actual timeline or time duration for measuring CSI and/or preparing the CSI report can meet (or more likely meet) the configured timeline or time duration. In an example, CSI reporting component 352 can determine whether it can or cannot finish all the measurements, or measurement preparation, in the configured timeline or time duration based at least in part on comparing an expected time duration of performing the CSI measurements over the selected sub-bands with the configured timeline or time duration.

For example, the timeline or time duration can begin when the CSI reporting component 352 receives a trigger to perform CSI reporting from the network node, which may include receiving of the CSI report configuration (e.g., for an aperiodic CSI report configuration), a report time trigger specified in the CSI report configuration (e.g., a periodic timeline for periodic CSI report configuration), etc. The CSI reporting component 352, however, may not know how many resources it has available for the CSI report until a subsequent time instance (e.g., as the scheduled resources may be multiplexed with HARQ-ACK or other non-CSI data). In this regard, the CSI reporting component 352 may complete its measurements by the subsequent time instance between report triggering and CSI report transmission. In one example, CSI reporting component 352 can measure sub-bands for codebooks (e.g., at Block 612) in a specific ordering (or in an ordering as configured) until the point in time where the measuring and report preparation is stopped to process other feedback for reporting over the same resources. In another example, sub-band adapting component 354 can attempt to adapt the sub-band sizes (e.g., such to measure some sub-bands instead of others at Block 614) for one or more codebooks in an effort to measure and report CSI over as many sub-bands for as many codebooks as possible within the allotted timeline (e.g., from the time of report triggering until some time before the CSI is to be reported allowing time for other feedback to be processed and included over the reporting resources).

For example, to measure and report CSI within the timeline, in measuring CSI at Block 614, sub-band adapting component 354 can measure CSI over some sub-bands instead of other sub-bands, and can accordingly drop some of the sub-band size measurements, or measurement preparation. In an example, sub-band adapting component 354 can determine an ordering for selecting which sub-bands to measure, which can be specified in the CSI report configuration or another configuration, which may be received in Block 610 or otherwise. In an example, sub-band adapting component 354 can use the same configuration specified for determining an ordering of sub-bands for which to report CSI to fit in the CSI report size limit. In this example, sub-band adapting component 354 can use the same configured reporting ordering, an opposite or reverse ordering of the configured ordering, or another specific ordering that is based on the configured ordering. In an example, using the opposite of the configured ordering may achieve a desirable trade-off between complexity and accuracy, in one example. In a specific example, referring to FIG. 7, the sub-band adapting component 354 may prepare only the sub-band sizes of 4 RB, 8 RB, and 16 RB for 32 antenna ports, and 4 RB and 8 RB for 16 antenna ports. In this example, the 16 ports largest and second largest sub-band sizes and the largest sub-band size of 32 ports are not processed to save CSI processing resources.

FIG. 8 illustrates a flow chart of an example of a method 800 for configuring a device for adapting a CSI report for transmission, in accordance with aspects described herein. In an example, a base station 102, or components of a disaggregated base station (e.g., one or more of a CU, DU, RU, etc.) can perform the functions described in method 800 using one or more of the components described in FIGS. 1 and 4.

In method 800, at Block 802, a CSI report configuration indicating a plurality of codebooks and a plurality of sub-bands associated with the plurality of codebooks can be transmitted, where the CSI report configuration can be associated with a CSI report size limit. In an aspect, CSI configuring component 452, e.g., in conjunction with processor(s) 412, memory 416, transceiver 402, BS communicating component 442, etc., can transmit the CSI report configuration indicating the plurality of codebooks and the plurality of sub-bands associated with the plurality of codebooks, where the CSI report configuration can be associated with a CSI report size limit. For example, the CSI report configuration can indicate the plurality of codebooks, where each codebook can indicate or otherwise relate to an antenna panel configuration including a number of active antenna panels (Ng) or antenna elements in each panel (N1,N2), etc., as described. The CSI report configuration can also indicate, for each codebook or for all codebooks, a plurality of sub-bands in frequency for which to report CSI based on a given codebook, where the sub-bands may include a wideband and one or more sub-bands of the wideband. The sub-bands can be of various sizes, which may be indicated in number of RB s or another measurement. For example, the CSI report configuration can specify, for a given codebook or all codebooks, to report CSI for 32 RBs, 16 RBs, 8 RBs, and/or 4 RBs, etc.

In one example, CSI configuring component 452 can indicate the CSI report size limit in the CSI report configuration. In an example, the CSI report size limit can be specified as a number of bits (e.g., a maximum quantity of bits) configured for the CSI report or for a portion of the CSI report. For example, the CSI report can include at least one of a RI, CQI, or PMI, and the CSI report size limit may be indicated as a maximum quantity of bits for the entire CSI report or for certain portions, such as the RI, CQI, and/or PMI, as described.

In method 800, at Block 804, a CSI report that is within the CSI report size limit can be received, where the CSI report includes CSI for at least a portion of the plurality of sub-bands associated with the plurality of codebooks. In an aspect, BS communicating component 442, e.g., in conjunction with processor(s) 412, memory 416, transceiver 402, etc., can receive, based on the CSI report configuration, the CSI report within the CSI report size limit, where the CSI report can include CSI for at least the portion of the plurality of sub-bands associated with the plurality of codebooks. For example, BS communicating component 442 can receive the CSI report, which may be adapted by the UE 104 to fit within the CSI report size limit, as described above. In an example, the CSI report may include CSI for some sub-bands for a given codebook (but not all sub-bands configured for the codebook in the CSI report configuration).

For example, as described in various aspects above, the CSI report may be based on an increase in a sub-band size for at least one of the plurality of sub-bands for at least one of the plurality of codebooks. In one example, the CSI report may include CSI reported based on an increase in sub-band size for one or more sub-bands of one codebook without an increase in sub-band size for another codebook, where the selection of codebook for which to adapt sub-band size can be based on a priority of the codebook, a size of the codebook (e.g., a number of antenna ports), etc. In another example, the CSI report can include CSI reported for a portion of sub-bands configured for a given codebook that is less than all sub-bands configured for the given codebook in the CSI report configuration. The reduction in number of sub-bands can be to comply with the CSI report size limit, to fit the CSI report in scheduled uplink resources for transmitting the CSI report, to comply with a processing timeline of the UE 104, etc., as described above.

In an example, BS communicating component 442 can adapt an antenna configuration based on the reported CSI. For example, BS communicating component 442 can change a number of antenna panels, a number of elements per panel, etc. used in transmitting communications to one or more UEs. BS communicating component 442, in an example, can change the antenna configuration based on a codebook for which CSI is reported, and can select certain communication parameters based on the CSI to adapt transmission to channel conditions.

In method 800, optionally at Block 806, a configuration indicating an ordering of sub-band sizes and/or associated codebooks can be transmitted. In an aspect, CSI configuring component 452, e.g., in conjunction with processor(s) 412, memory 416, transceiver 402, BS communicating component 442, etc., can transmit the configuration indicating the ordering of sub-band sizes and/or associated codebooks. For example, CSI configuring component 452 can transmit the configuration indicating the ordering of sub-band sizes and/or associated codebooks. In an example, CSI configuring component 452 can transmit this configuration as part of the CSI report configuration or a separate configuration. In one example, CSI configuring component 452 can transmit this configuration in RRC signaling. For example, BS communicating component 442 can receive the CSI report that includes CSI for sub-bands having increased sub-band size where the sub-bands for which to increase the size are determined based on the configuration, as described above. In another example, BS communicating component 442 can receive the CSI report that includes CSI for a portion of sub-bands that are selected based on the configuration, as described above. As described, for example, a first one of multiple sub-bands for a given codebook can be selected for reporting (and/or measuring) instead of a second one of the multiple sub-bands, where the selection is based on an ordering indicated in the configuration. In other examples, as described, the selection of sub-bands and/or codebooks for which to adapt the sub-bands (whether by an increase in size or a selection of a subset of the sub-bands) can be based on codebook size, codebook priority, etc.

Figure 9:
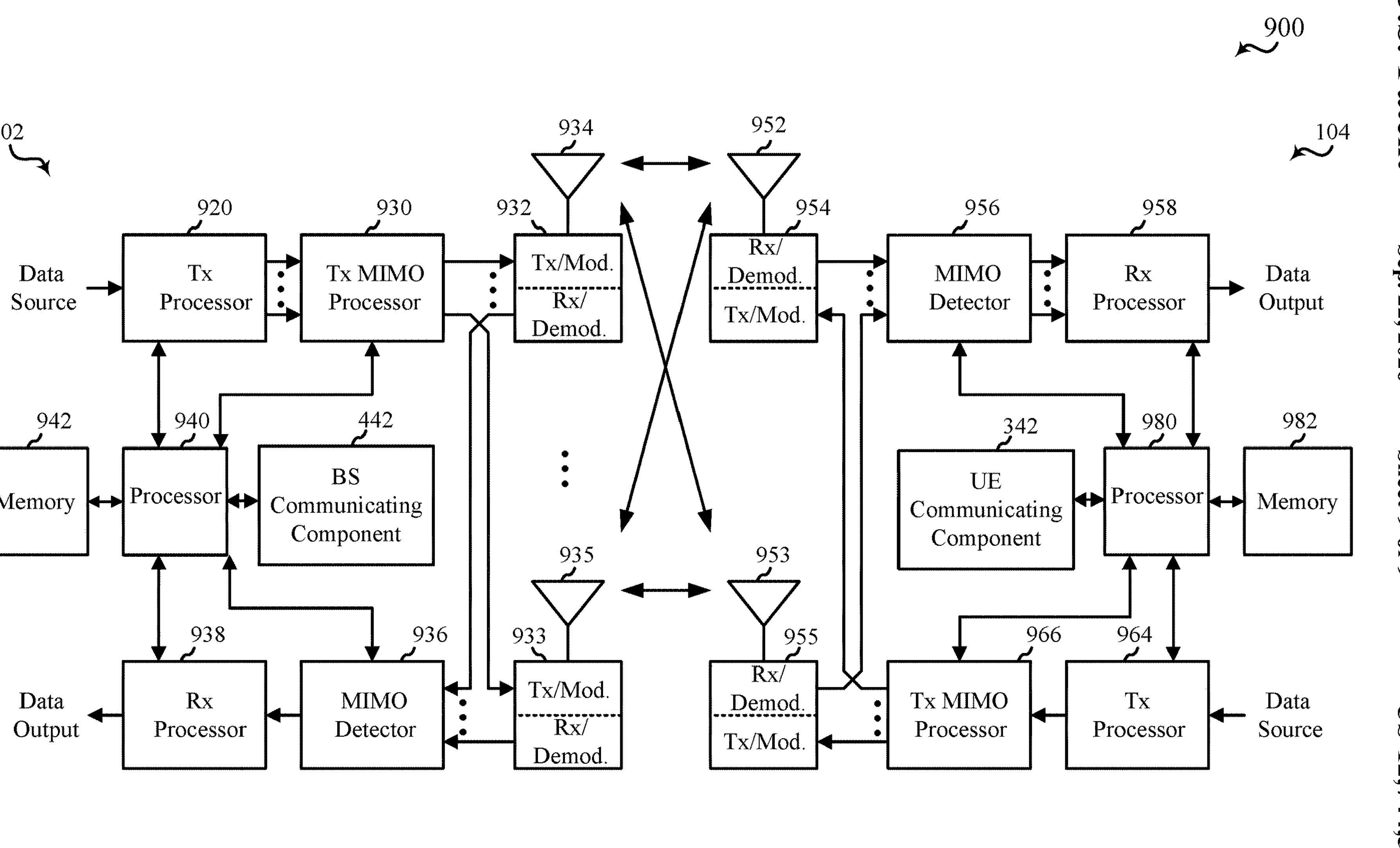
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1 and 3. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 342 (see e.g., FIGS. 1 and 3).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication including receiving a CSI report configuration indicating a plurality of codebooks and a plurality of sub-bands associated with the plurality of codebooks, the CSI report configuration associated with a CSI report size limit, and transmitting, based on the CSI report configuration, a CSI report within the CSI report size limit, the CSI report including CSI for at least a portion of the plurality of sub-bands associated with the plurality of codebooks.

In Aspect 2, the method of Aspect 1 includes where the CSI includes at least one of a CQI or a PMI.

In Aspect 3, the method of any of Aspects 1 or 2 includes where the CSI report size limit is indicated in the CSI report configuration as a maximum quantity of bits configured for a portion of the CSI or for the CSI report, where the portion of the CSI includes at least one of a CQI or a PMI.

In Aspect 4, the method of any of Aspects 1 to 3 includes transmitting the CSI report based on an increase in a sub-band size for at least one of the plurality of sub-bands, the increase being based on determining that the CSI report may exceed the CSI report size limit prior to the increase.

In Aspect 5, the method of Aspect 4 includes where the CSI report size limit relates to a size of an uplink resource for transmitting the CSI report.

In Aspect 6, the method of any of Aspects 1 to 5 includes transmitting the CSI report based on an increase in a sub-band size for at least one of the plurality of sub-bands associated with a first one of the plurality of codebooks and without an increase sub-band size for the plurality of sub-bands associated with a second one of the plurality of codebooks.

In Aspect 7, the method of any of Aspects 1 to 6 includes receiving a configuration indicating an ordering of sub-band sizes and associated codebooks, and transmitting the CSI report based on an increase in a sub-band size for at least one of the plurality of sub-bands associated with at least one of the plurality of codebooks according to the indicated ordering.

In Aspect 8, the method of any of Aspects 1 to 7 includes where the CSI report configuration indicates, for each codebook in the plurality of codebooks, at least a portion of the plurality of sub-bands including multiple sub-bands of different sub-band sizes.

In Aspect 9, the method of Aspect 8 includes transmitting the CSI report including, for each codebook in the plurality of codebooks, CSI for a first one of the multiple sub-bands instead of a second one of the multiple sub-bands based on the first one of the multiple sub-bands having an increased size over the second one of the multiple sub-bands.

In Aspect 10, the method of any of Aspects 8 or 9 includes where the CSI report configuration further indicates a high priority or a low priority respectively for each codebook in the plurality of codebooks, and transmitting the CSI report including, for a first codebook in the plurality of codebooks having the low priority, CSI for a first one of the multiple sub-bands instead of a second one of the multiple sub-bands based on the first one of the multiple sub-bands having an increased size over the second one of the multiple sub-bands, and transmitting the CSI report including, for a second codebook in the plurality of codebooks having the high priority, CSI for each of the multiple sub-bands indicated for the second codebook.

In Aspect 11, the method of any of Aspects 8 to 10 includes receiving a configuration indicating an ordering of sub-band sizes, and transmitting the CSI report in an uplink resource and including, for at least a subset of the plurality of codebooks, CSI for at least a first one of the multiple sub-bands instead of at least a second one of the multiple sub-bands based on the first one of the multiple sub-bands having an increased size over the second one of the multiple sub-bands and according to the indicated ordering to comply with the CSI report size limit.

In Aspect 12, the method of any of Aspects 8 to 11 includes transmitting the CSI report including, for at least a first codebook in the plurality of codebooks, CSI for at least a first one of the multiple sub-bands instead of at least a second one of the multiple sub-bands based on the first one of the multiple sub-bands having an increased size over the second one of the multiple sub-bands and according to a configured ordering, where the configured ordering indicates including CSI for a first one of the multiple sub-bands having the increased size, then a third one of the multiple sub-bands for the first codebook having an increased size over the first one of the multiple sub-bands, then a first one of the multiple sub-bands for a second codebook having an increased size over a second one of the multiple sub-bands for the second codebook, then a fourth one of the multiple sub-bands for the first codebook having an increased size over the third one of the multiple sub-bands for the first codebook.

In Aspect 13, the method of Aspect 12 includes transmitting the CSI report according to the configured ordering to comply with the CSI report size limit.

In Aspect 14, the method of any of Aspects 1 to 13 includes selecting, based on comparing an expected time duration of performing CSI measurements to a configured time duration for the CSI measurements, at least the portion of the plurality of sub-bands associated with the plurality of codebooks for which to measure CSI, and not including all of the plurality of sub-bands.

In Aspect 15, the method of Aspect 14 includes selecting, based on a configured ordering, at least the portion of the plurality of sub-bands associated with the plurality of codebooks for which to measure CSI.

In Aspect 16, the method of Aspect 14 includes selecting, based on a configured ordering, at least the portion of the plurality of sub-bands associated with the plurality of codebooks for which to measure CSI, or selecting, according to a different ordering, at least the portion of the plurality of sub-bands associated with the plurality of codebooks for which to measure CSI, where the different ordering is at least one of a reverse ordering of the configured ordering, or another ordering that is determined based on the configured ordering.

Aspect 17 is a method for wireless communication including transmitting a CSI report configuration indicating a plurality of codebooks and a plurality of sub-bands associated with the plurality of codebooks, the CSI report configuration associated with a CSI report size limit, and receiving, based on the CSI report configuration, a CSI report within the CSI report size limit, the CSI report including CSI for at least a portion of the plurality of sub-bands associated with the plurality of codebooks.

In Aspect 18, the method of Aspect 17 includes where the CSI report is based on an increase in a sub-band size for at least one of the plurality of sub-bands.

In Aspect 19, the method of any of Aspects 17 or 18 includes where the CSI report is based on an increase in a sub-band size for at least one of the plurality of sub-bands associated with a first one of the plurality of codebooks and without an increase in sub-band size for the plurality of sub-bands associated with a second one of the plurality of codebooks.

In Aspect 20, the method of any of Aspects 17 to 19 includes transmitting a configuration indicating an ordering of sub-band sizes and associated codebooks, and where the CSI report is based on an increase in a sub-band size for at least one of the plurality of sub-bands associated with at least one of the plurality of codebooks according to the indicated ordering.

In Aspect 21, the method of any of Aspects 17 to 20 includes where the CSI report configuration further indicates, for each codebook in the plurality of codebooks, at least a portion of the plurality of sub-bands including multiple sub-bands of different sub-band sizes.

In Aspect 22, the method of Aspect 21 includes where the CSI report includes, for each codebook in the plurality of codebooks, CSI for a first one of the multiple sub-bands instead of a second one of the multiple sub-bands based on the first one of the multiple sub-bands having an increased size over the second one of the multiple sub-bands.

In Aspect 23, the method of any of Aspects 21 or 22 includes where the CSI report configuration further indicates a high priority or a low priority respectively for each of the codebooks, where the CSI report includes, for a first codebook in the plurality of codebooks having the low priority, CSI for a first one of the multiple sub-bands instead of a second one of the multiple sub-bands based on the first one of the multiple sub-bands having an increased size over the second one of the multiple sub-bands and where the CSI report includes, for a second codebook in the plurality of codebooks having the high priority, CSI for each of the multiple sub-bands indicated for the second codebook.

In Aspect 24, the method of any of Aspects 21 to 23 includes transmitting a configuration indicating an order of sub-band sizes, and where the CSI report includes, for at least a subset of the plurality of codebooks, CSI for at least a first one of the multiple sub-bands instead of at least a second one of the multiple sub-bands based on the first one of the multiple sub-bands having an increased size over the second one of the multiple sub-bands and according to the indicated ordering.

In Aspect 25, the method of any of Aspects 21 to 24 includes where the CSI report includes, for at least a first codebook in the plurality of codebooks, CSI for at least a first one of the multiple sub-bands instead of at least a second one of the multiple sub-bands based on the first one of the multiple sub-bands having an increased size over the second one of the multiple sub-bands and according to a configured ordering, where the configured ordering indicates including CSI for a first one of the multiple sub-bands having the increased size, then a third one of the multiple sub-bands for the first codebook having an increased size over the first one of the multiple sub-bands, then a first one of the multiple sub-bands for a second codebook having an increased size over a second one of the multiple sub-bands for the second codebook, then a fourth one of the multiple sub-bands for the first codebook having an increased size over the third one of the multiple sub-bands for the first codebook.

Aspect 26 is an apparatus for wireless communication including a processor, memory coupled with the processor, and instructions stored in the memory and operable, when executed by the processor, to cause the apparatus to perform any of the methods of Aspects 1 to 25.

Aspect 27 is an apparatus for wireless communication including means for performing any of the methods of Aspects 1 to 25.

Aspect 28 is a computer-readable medium including code executable by one or more processors for wireless communications, the code including code for performing any of the methods of Aspects 1 to 25.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:

a processor;

memory coupled with the processor; and instructions stored in the memory and operable, when executed by the processor, to cause the apparatus to:

receive a channel state information (CSI) report configuration indicating a plurality of codebooks and a plurality of sub-bands associated with the plurality of codebooks, wherein a first codebook of the plurality of codebooks is indicated as associated with a first set of the plurality of sub-bands, wherein a second codebook of the plurality of codebooks is indicated as associated with a second set of the plurality of sub-bands that is different than the first set of the plurality of sub-bands, and wherein the CSI report configuration associated with a CSI report size limit, wherein the CSI report size limit is indicated in the CSI report configuration as a maximum quantity of bits configured for a portion of the CSI or for the CSI report, wherein the portion of the CSI includes at least one of a channel quality indicator (CQI) or a precoding matrix indicator (PMI); and transmit, based on the CSI report configuration, a CSI report within the CSI report size limit, the CSI report including CSI for at least a portion of the plurality of sub-bands associated with the plurality of codebooks.

2. The apparatus of claim 1, wherein the CSI includes at least one of a channel quality indicator (CQI) or a precoding matrix indicator (PMI).

3. The apparatus of claim 1, wherein the instructions, when executed by the processor, further cause the apparatus to:

transmit the CSI report based on an increase in a sub-band size for at least one of the plurality of sub-bands, the increase being based on determining that the CSI report may exceed the CSI report size limit prior to the increase.

4. The apparatus of claim 3, wherein the CSI report size limit relates to a size of an uplink resource for transmitting the CSI report.

5. The apparatus of claim 1, wherein the instructions, when executed by the processor, further cause the apparatus to:

transmit the CSI report based on an increase in a sub-band size for at least one of the first set of the plurality of sub-bands associated with the first codebook and without an increase in a sub-band size for the second set of the plurality of sub-bands associated with the second codebook.

6. The apparatus of claim 1, wherein the instructions, when executed by the processor, further cause the apparatus to:

receive a configuration indicating an ordering of sub-band sizes and associated codebooks; and transmit the CSI report based on an increase in a sub-band size for at least one of the plurality of sub-bands associated with at least one of the plurality of codebooks according to the indicated ordering.

7. The apparatus of claim 1, wherein the CSI report configuration indicates, for each codebook in the plurality of codebooks, at least a portion of the plurality of sub-bands including multiple sub-bands of different sub-band sizes.

8. The apparatus of claim 7, wherein the instructions, when executed by the processor, further cause the apparatus to:

transmit the CSI report including, for each codebook in the plurality of codebooks, CSI for a first one of the multiple sub-bands instead of a second one of the multiple sub-bands based on the first one of the multiple sub-bands having an increased size over the second one of the multiple sub-bands.

9. The apparatus of claim 7, wherein the CSI report configuration further indicates a high priority or a low priority respectively for each codebook in the plurality of codebooks, and wherein the instructions, when executed by the processor, further cause the apparatus to:

transmit the CSI report including, for the first codebook in the plurality of codebooks having the low priority, CSI for a first one of the multiple sub-bands instead of a second one of the multiple sub-bands based on the first one of the multiple sub-bands having an increased size over the second one of the multiple sub-bands; and transmit the CSI report including, for the second codebook in the plurality of codebooks having the high priority, CSI for each of the multiple sub-bands indicated for the second codebook.

10. The apparatus of claim 7, wherein the instructions, when executed by the processor, further cause the apparatus to:

receive a configuration indicating an ordering of sub-band sizes; and transmit the CSI report in an uplink resource and including, for at least a subset of the plurality of codebooks, CSI for at least a first one of the multiple sub-bands instead of at least a second one of the multiple sub-bands based on the first one of the multiple sub-bands having an increased size over the second one of the multiple sub-bands and according to the indicated ordering to comply with the CSI report size limit.

11. The apparatus of claim 7, wherein the instructions, when executed by the processor, further cause the apparatus to:

transmit the CSI report including, for at least the first codebook in the plurality of codebooks, CSI for at least a first one of the multiple sub-bands instead of at least a second one of the multiple sub-bands based on the first one of the multiple sub-bands having an increased size over the second one of the multiple sub-bands and according to a configured ordering, wherein the configured ordering indicates including CSI for a first one of the multiple sub-bands having the increased size, then a third one of the multiple sub-bands for the first codebook having an increased size over the first one of the multiple sub-bands, then a first one of the multiple sub-bands for the second codebook having an increased size over a second one of the multiple sub-bands for the second codebook, then a fourth one of the multiple sub-bands for the first codebook having an increased size over the third one of the multiple sub-bands for the first codebook.

12. The apparatus of claim 11, wherein the instructions, when executed by the processor, further cause the apparatus to:

transmit the CSI report according to the configured ordering to comply with the CSI report size limit.

13. The apparatus of claim 1, wherein the instructions, when executed by the processor, further cause the apparatus to:

select, based on comparing an expected time duration of performing CSI measurements to a configured time duration for the CSI measurements, at least the portion of the plurality of sub-bands associated with the plurality of codebooks for which to measure CSI, and not including all of the plurality of sub-bands.

14. The apparatus of claim 13, wherein the instructions, when executed by the processor, further cause the apparatus to:

select, based on a configured ordering, at least the portion of the plurality of sub-bands associated with the plurality of codebooks for which to measure CSI.

15. The apparatus of claim 13, wherein the instructions, when executed by the processor, further cause the apparatus to at least one of:

select, based on a configured ordering, at least the portion of the plurality of sub-bands associated with the plurality of codebooks for which to measure CSI; or select, according to a different ordering, at least the portion of the plurality of sub-bands associated with the plurality of codebooks for which to measure CSI, wherein the different ordering is at least one of a reverse ordering of the configured ordering, or another ordering that is determined based on the configured ordering.

16. An apparatus for wireless communication, comprising:

a processor;

memory coupled with the processor; and instructions stored in the memory and operable, when executed by the processor, to cause the apparatus to:

transmit a channel state information (CSI) report configuration indicating a plurality of codebooks and a plurality of sub-bands associated with the plurality of codebooks, wherein a first codebook of the plurality of codebooks is indicated as associated with a first set of the plurality of sub-bands, wherein a second codebook of the plurality of codebooks is indicated as associated with a second set of the plurality of sub-bands that is different than the first set of the plurality of sub-bands, and wherein the CSI report configuration associated with a CSI report size limit, wherein the CSI report size limit is indicated in the CSI report configuration as a maximum quantity of bits configured for a portion of the CSI or for the CSI report, wherein the portion of the CSI includes at least one of a channel quality indicator (CQI) or a precoding matrix indicator (PMI); and receive, based on the CSI report configuration, a CSI report within the CSI report size limit, the CSI report including CSI for at least a portion of the plurality of sub-bands associated with the plurality of codebooks.

17. The apparatus of claim 16, wherein the CSI report is based on an increase in a sub-band size for at least one of the plurality of sub-bands.

18. The apparatus of claim 16, wherein the CSI report is based on an increase in a sub-band size for at least one of the plurality of sub-bands associated with a first one of the plurality of codebooks and without an increase in a sub-band size for the plurality of sub-bands associated with a second one of the plurality of codebooks.

19. The apparatus of claim 16, wherein the instructions, when executed by the processor, further cause the apparatus to:

transmit a configuration indicating an ordering of sub-band sizes and associated codebooks, wherein the CSI report is based on an increase in a sub-band size for at least one of the plurality of sub-bands associated with at least one of the plurality of codebooks according to the indicated ordering.

20. The apparatus of claim 16, wherein the CSI report configuration further indicates, for each codebook in the plurality of codebooks, at least a portion of the plurality of sub-bands including multiple sub-bands of different sub-band sizes.

21. The apparatus of claim 20, wherein the CSI report includes, for each codebook in the plurality of codebooks, CSI for a first one of the multiple sub-bands instead of a second one of the multiple sub-bands based on the first one of the multiple sub-bands having an increased size over the second one of the multiple sub-bands.

22. The apparatus of claim 20, wherein the CSI report configuration further indicates a high priority or a low priority respectively for each of the codebooks, wherein the CSI report includes, for the first codebook in the plurality of codebooks having the low priority, CSI for a first one of the multiple sub-bands instead of a second one of the multiple sub-bands based on the first one of the multiple sub-bands having an increased size over the second one of the multiple sub-bands, and wherein the CSI report includes, for the second codebook in the plurality of codebooks having the high priority, CSI for each of the multiple sub-bands indicated for the second codebook.

23. The apparatus of claim 20, wherein the instructions, when executed by the processor, further cause the apparatus to:

transmit a configuration indicating an order of sub-band sizes, wherein the CSI report includes, for at least a subset of the plurality of codebooks, CSI for at least a first one of the multiple sub-bands instead of at least a second one of the multiple sub-bands based on the first one of the multiple sub-bands having an increased size over the second one of the multiple sub-bands and according to the indicated ordering.

24. The apparatus of claim 20, wherein the CSI report includes, for at least the first codebook in the plurality of codebooks, CSI for at least a first one of the multiple sub-bands instead of at least a second one of the multiple sub-bands based on the first one of the multiple sub-bands having an increased size over the second one of the multiple sub-bands and according to a configured ordering, wherein the configured ordering indicates including CSI for a first one of the multiple sub-bands having the increased size, then a third one of the multiple sub-bands for the first codebook having an increased size over the first one of the multiple sub-bands, then a first one of the multiple sub-bands for the second codebook having an increased size over a second one of the multiple sub-bands for the second codebook, then a fourth one of the multiple sub-bands for the first codebook having an increased size over the third one of the multiple sub-bands for the first codebook.

25. A method of wireless communication at a user equipment (UE), comprising:

receiving a channel state information (CSI) report configuration indicating a plurality of codebooks and a plurality of sub-bands associated with the codebooks, wherein a first codebook of the plurality of codebooks is indicated as associated with a first set of the plurality of sub-bands, wherein a second codebook of the plurality of codebooks is indicated as associated with a second set of the plurality of sub-bands that is different than the first set of the plurality of sub-bands, and wherein the CSI report configuration further indicating a CSI report size limit, wherein the CSI report size limit is indicated in the CSI report configuration as a maximum quantity of bits configured for a portion of the CSI or for the CSI report, wherein the portion of the CSI includes at least one of a channel quality indicator (CQI) or a precoding matrix indicator (PMI); and transmitting, based on the CSI report configuration, a CSI report within the CSI report size limit, the CSI report including CSI for the plurality of sub-bands associated with the codebooks.

26. The method of claim 25, wherein the CSI includes at least one of a channel quality indicator (CQI) or a precoding matrix indicator (PMI).

27. A method of wireless communication at a network node, comprising:

transmitting a channel state information (CSI) report configuration indicating a plurality of codebooks and a plurality of sub-bands associated with the codebooks, wherein a first codebook of the plurality of codebooks is indicated as associated with a first set of the plurality of sub-bands, wherein a second codebook of the plurality of codebooks is indicated as associated with a second set of the plurality of sub-bands that is different than the first set of the plurality of sub-bands, and wherein the CSI report configuration further indicating a CSI report size limit, wherein the CSI report size limit is indicated in the CSI report configuration as a maximum quantity of bits configured for a portion of the CSI or for the CSI report, wherein the portion of the CSI includes at least one of a channel quality indicator (CQI) or a precoding matrix indicator (PMI); and receiving, based on the CSI report configuration, a CSI report within the CSI report size limit, the CSI report including CSI for the plurality of sub-bands associated with the plurality of codebooks.

28. The method of claim 27, wherein the CSI report is based on an increase in a sub-band size for at least one of the plurality of sub-bands.

* * * * *